June 5, 1923.
G. S. CHILES
CAR TRUCK
Filed Jan. 8, 1923
1,457,345
6 Sheets-Sheet 1
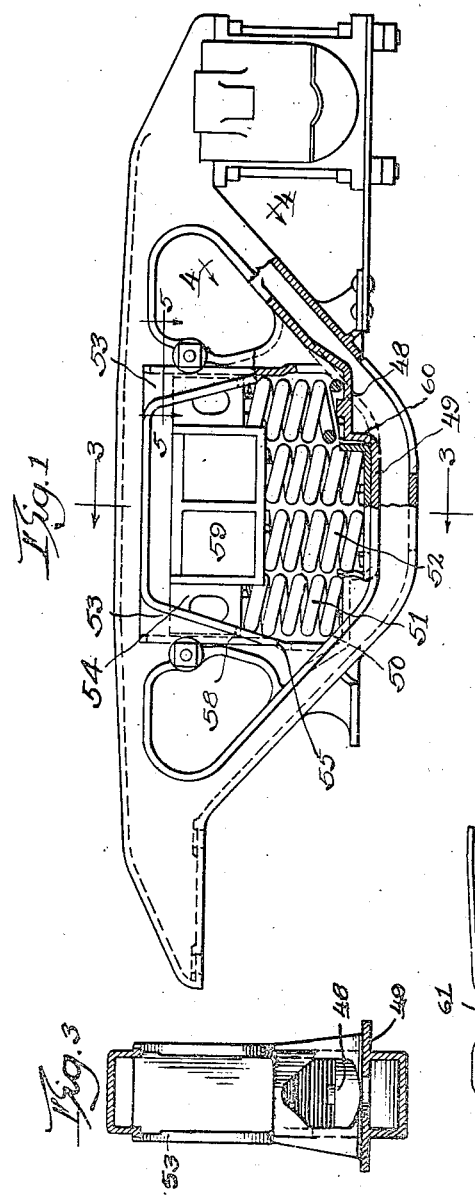
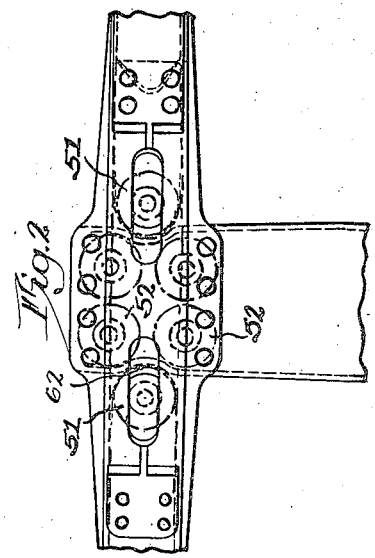
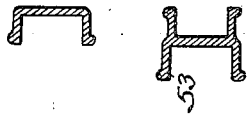
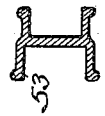
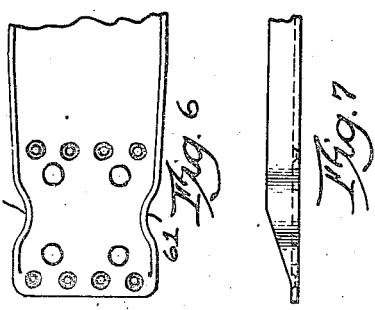
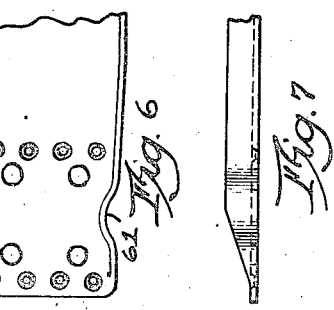
Inventor
George S. Chiles, June 5, 1923.
G. S. CHILES
CAR TRUCK
Filed Jan. 8, 1923
1,457,345
6 Sheets-Sheet 2
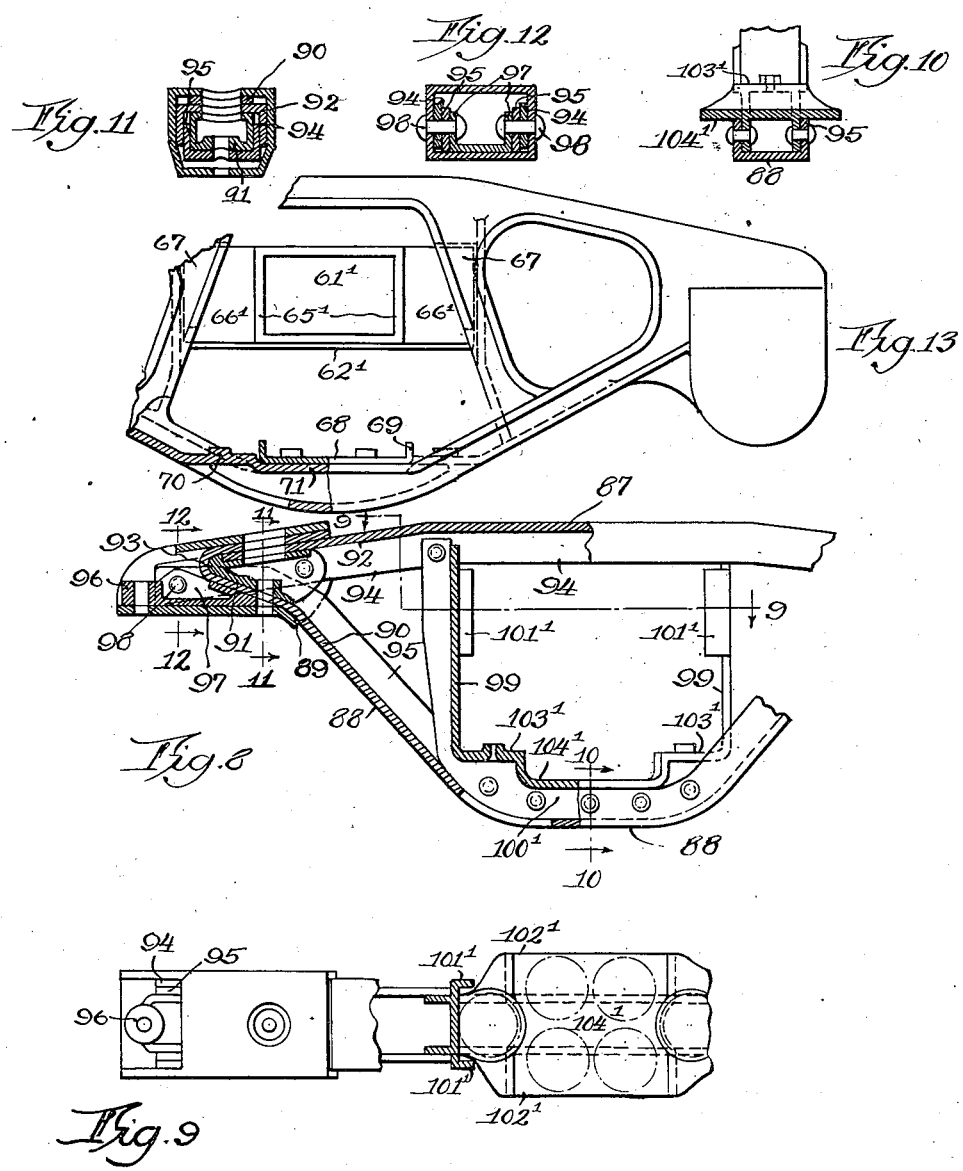

June 5, 1923.
G. S. CHILES
CAR TRUCK
Filed Jan. 8, 1923   6 Sheets-Sheet 3
1,457,345
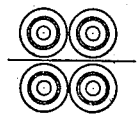
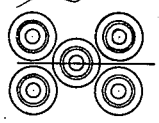
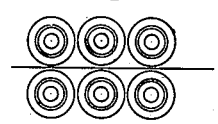
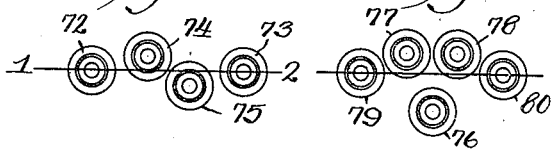
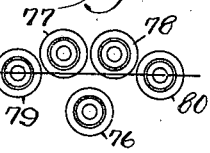
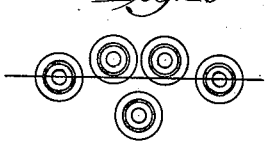
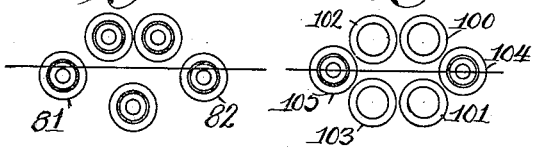
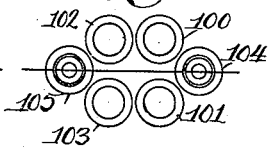
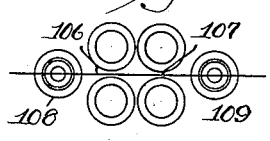
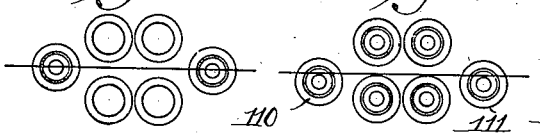
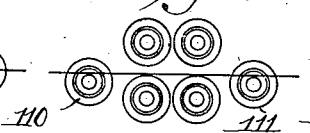
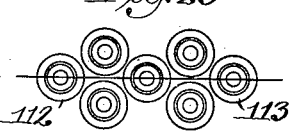
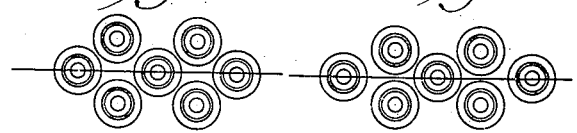
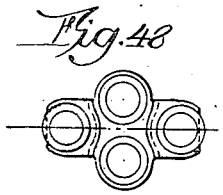
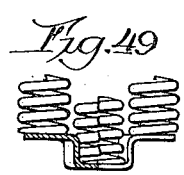
Inventor
George S. Chiles,
Bulfield Poole Hinton West Attys.

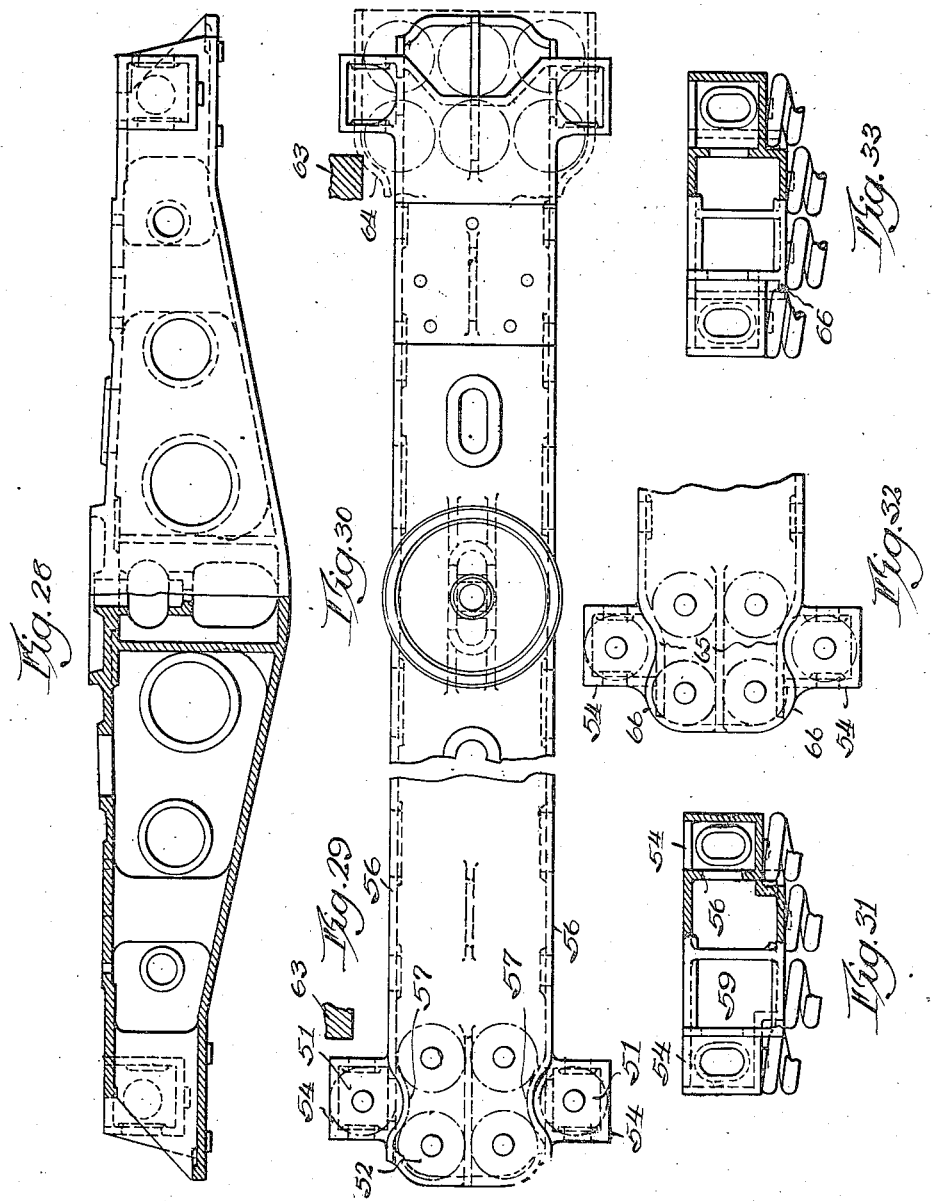

June 5, 1923.
G. S. CHILES
CAR TRUCK
Filed Jan. 8, 1923
1,457,345
6 Sheets-Sheet 5
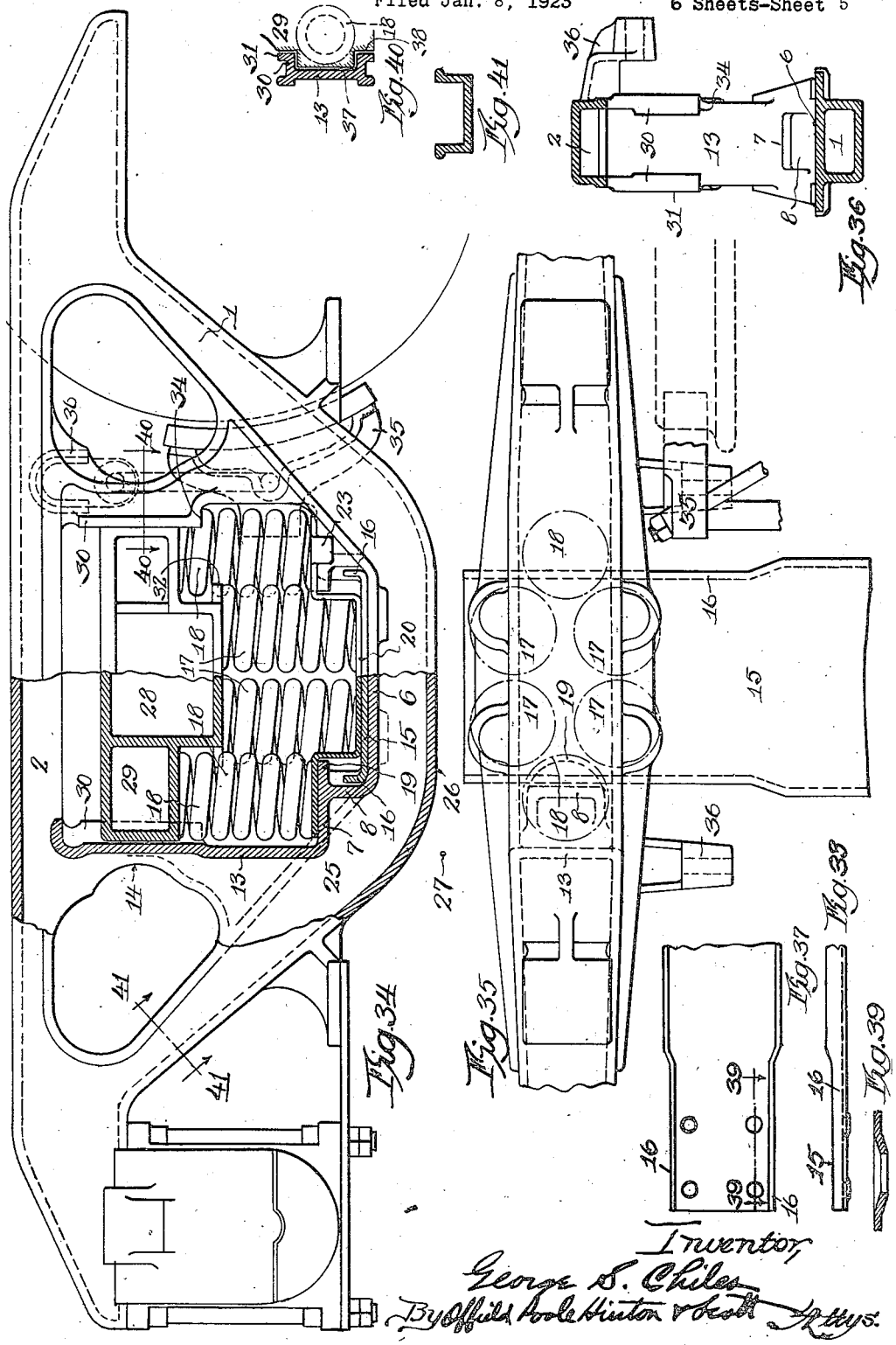

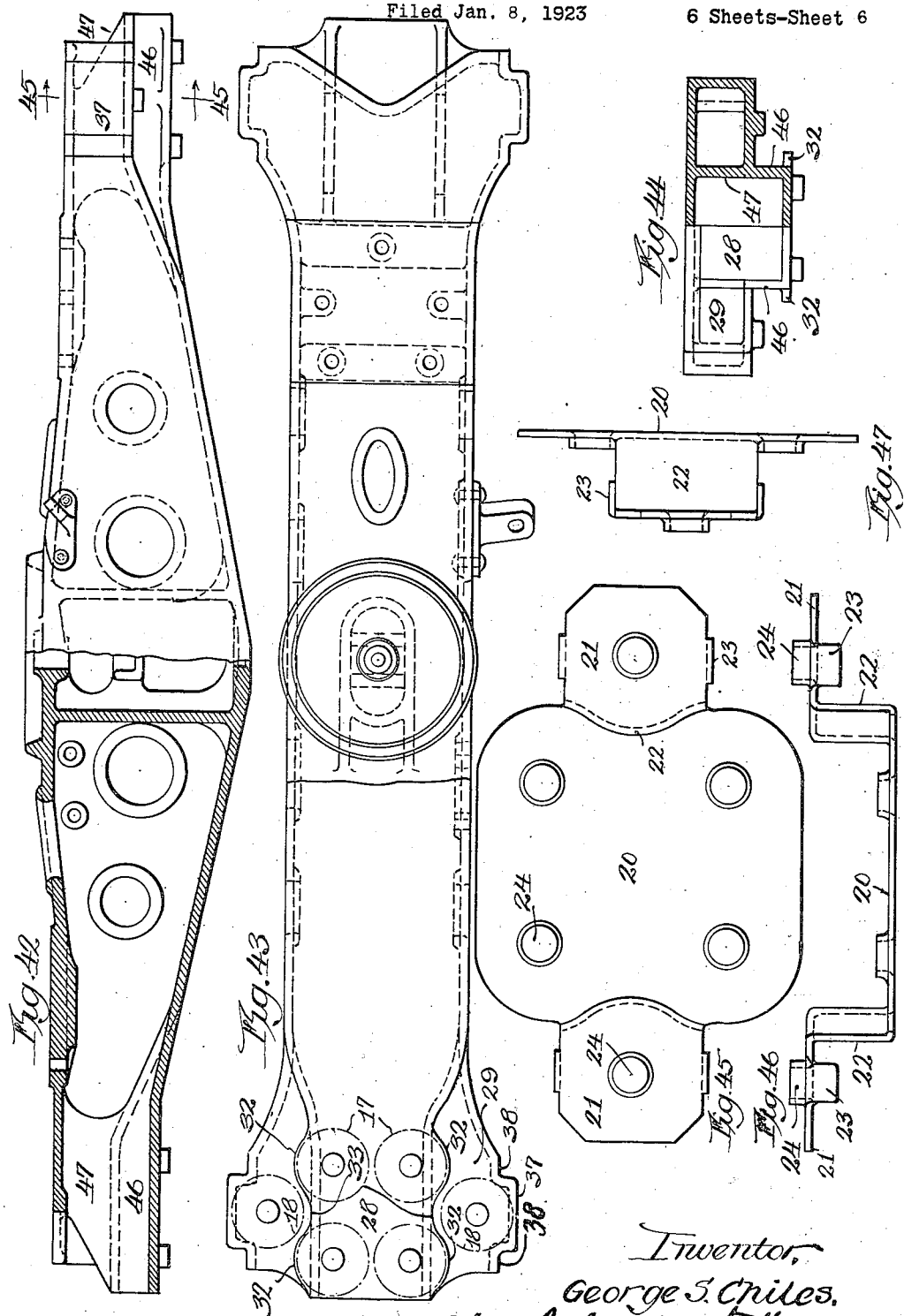

Patented June 5, 1923.

1,457,345

UNITED STATES PATENT OFFICE.

GEORGE S. CHILES, OF CHICAGO, ILLINOIS, ASSIGNOR OF ONE-HALF TO JOHN W. DALMAN, OF CHICAGO, ILLINOIS.

CAR TRUCK.

Application filed January 8, 1923. Serial No. 611,387.

*To all whom it may concern:*

Be it known that I, GEORGE S. CHILES, a citizen of the United States, and a resident of Chicago, in the county of Cook and State of Illinois, have invented certain new and useful Improvements in Car Trucks, of which the following is a specification.

This application is a continuation in part of my prior copending applications Serial No. 561,132 for railway truck filed May 15, 1922, Ser. No. 470,465 for railway truck construction filed May 17, 1921, and Ser. No. 516,554 for trucks filed November 21, 1921. Figures 1 to 33 of the drawing of this application are identical with Figures 27 to 38, 22, 1 to 14, and 55 to 60, respectively, of application Serial No. 561,132. Figures 34 to 47 of the drawing of this application show a slightly different embodiment of my invention, the principle and structural elements being the same as disclosed in Figures 1 to 33. Figures 48 and 49 are new views and show the spring arrangement of Figure 2 applied to four springs instead of six.

The novel features of construction which constitute my invention accomplish the object of obtaining greater strength for the weight of metal used in the truck side-frame and bolster, and accomplish this object by means of a form of structure which also permits the number of springs to be increased to the extent needed upon cars of increasing capacity. Subsidiary objects of the invention and the means and principles utilized for the accomplishment of the objects stated can best be set forth in connection with the following detailed description of the several structures herein disclosed as illustrations of forms in which my invention may be embodied. In the drawings Figure 1 is a side elevation view of a truck embodying my invention, Figure 2 is a bottom view of the structure shown in Figure 1, Figure 3, 4 and 5 are respectively sections on lines 3—3, 4—4, and 5—5, of Figure 1.

Figure 6 is a top view of the end of the spring plank shown in Figure 1,

Figure 7 is a side elevation of the end of the spring plank of Figure 1,

Figure 8 is a side elevation, partly in section, of a built up side-frame embodying features of my invention, Figures 9, 10, 11 and 12 are sections respectively on lines 9—9, 10—10, 11—11, and 12—12, of Figure 8, Figure 13 shows a side-frame in which the journal boxes are integrally formed and the integrality of the journal boxes is utilized to improve the form of the tension member of the side-frame.

Figures 14, 15, 16, 48 and 49 represent different spring assemblages heretofore used with all of the springs on the same level but not with end springs elevated as indicated in Figure 49.

In Figures 17 to 27 (also Figures 48 and 49) I illustrate different forms of my improved spring assemblage, all adapted to have the single end springs elevated and to have all or some of the intermediate springs offset from the line joining the centers of the end springs.

Figure 28 is a side elevation view partly in section of the bolster less completely illustrated in Figure 1, Figures 29 and 30 show respectively views from below and above of the ends of the bolster shown in Figure 28, Figures 29 and 30 being placed in such relation as to exhibit the external contour of the complete bolster and the relation of the brake-heads thereto.

Figure 31 is an end view partly in section of the bolster shown in Figure 28.

Figures 32 and 33 are similar to Figures 29 and 31 with slight modifications.

Figure 34 is a side elevation of a truck embodying my invention in a form differing in some respects from the structures shown in the preceding views.

Figure 35 is a bottom plan view of the central part of the structure shown in Figure 34, Figure 36 is a central vertical section through the structure shown in Figure 34.

Figures 37 and 38 are respectively a top and edge view of the end of the spring plank of the structure shown in Figure 34.

Figure 39 is a section on line 39—39 of Figure 37.

Figures 40 and 41 are sections respectively on lines 40—40 and 41—41 of Figure 34.

Figure 42 is a side view partly in section of the bolster forming part of the truck shown in Figure 34.

Figure 43 is a plan view of the bolster shown in Figure 42, the left-hand end being a bottom view and the right-hand end and central part a top view.

Figure 44 is an end view partly in section of the bolster shown in Figures 34, 42 and 43.

Figures 45, 46 and 47 are respectively top, end, and side views of a spring plate forming part of the structure shown in Figure 34.

Figures 48 and 49 show in plan and elevation an arrangement of four springs with single elevated end springs.

I will first explain the principles of my invention in connection with the structure shown in Figures 34 to 47, these views being on a larger scale and showing the relation of the brake mechanism to the spring plank, side-frame, and springs.

As above stated, a principal object of the invention is to increase the strength of the frame for a given weight of metal used, but in connection with this object a further purpose is to render possible an increase of the spring capacity by adding to the number of springs ordinarily used. I have found that by the adoption of the forms of construction hereinafter described, I am enabled to approximate the form of a suspension line in the tension member and to utilize this form of tension member for the accommodation of an additional number of springs when additional spring capacity is necessary. By forming the tension member in a true suspension line, that is, the line that would be imposed upon a flexible member, such as a cable, with the service load distributed as in practice, all stresses would be eliminated from the tension member other than tensile stresses. By using a single spring at each end of the spring assemblage I lengthen the spring assemblage longitudinally of the side frame, thus distributing the load over a greater length, thereby flattening the suspension line defined by imposing the service load upon the side frame. This flattening of the suspension line has the effect of increasing the head room for the end springs. By forming the spring seat as an integral part of the tension member or as a part rigidly connected thereto and forming therewith a unitary structure, and by elevating the end sections of the spring seat remote from the center of the side-frame, I am enabled to dispose the cross-sectional center of mass of the tension member substantially upon the theoretical suspension line without the addition of any substantial amount of metal not contributory to resisting the tensile stresses upon the tension member.

In the type of side-frame in common use in which all of the springs rest upon a horizontal section of the tension member between the columns, this part of the tension member acts largely as a beam subject to high bending stresses, and a relatively sharp angle is necessary in the tension member at the bases of the columns in order to give the end portions the necessary upward inclination toward the journal boxes. These sharp angles at the junction of the columns and tension member introduce additional complicated stresses, and the depth of the bolster together with the vertical space necessary for the springs and the necessary road clearance prevent deepening the section of the tension member at these points to an extent sufficient to resist the service stresses without the introduction of metal in excess of what would be necessary if greater vertical depth could be given to the tension member at this point. My improved construction remedies these defects. The elevated ends of the spring seat and the resulting approximation to a suspension line tension member eliminate the sharp angles in the tension member at the bases of the columns and increase the vertical depth of the section of the tension member at those points. The elevation of the end sections of the spring seat raises the entire section of the tension member at these points, and it is by reason of this fact that the objectionable angles are eliminated while at the same time increasing the vertical depth of the tension member section at this point. The double object is accomplished of approximating the suspension line with the conversion of most of the stresses into tension and the improvement in the tension member section resulting from its increased vertical depth adjacent the bases of the columns. The approximation to a suspension line in the tension member has the further effect by eliminating the sharp angles at the bases of the columns of shortening the tension member, all contributing to reduction in weight.

In trucks as ordinarily constructed, the movement of the brake-head is limited by the spring plank and by the springs themselves, the latter ordinarily being arranged two abreast transversely of the side-frame and resting on the spring plank. This imposes a limitation on the length of the wheel base by reason of the necessity of spacing the axles far enough from the center of the side frames to afford space for the necessary movement of the brake-heads between the peripheries of the wheels and the spring plank. By providing single springs at each end of the spring assemblage and restricting the width of the spring plank to the width of the group of springs between the end springs I render it possible to introduce additional springs not only without lengthening the wheel base, but while actually shortening it. This results from the fact that the single end springs lying substantially upon the longitudinal center line of the tension member do not extend inwardly into the path of movement of the brake-head, and as the spring plank does not extend under the end springs there is a free path of movement for the brake-heads abreast of the end springs and outside of the spring plank. The form of bolster employed in my improved truck also contributes to the objects above set forth. The main bolster structure is made of such width as not to interfere with the movement of the brake-heads and at the ends extensions are provided projecting over and seated upon the single end springs. As will more clearly appear from the detailed description, the part of the ends of the bolster bearing upon the intermediate group of springs is of greater depth than the projections which extend over the end springs.

In structures heretofore designed, and some of them used to a limited extent, attempts have been made to increase the number of springs supporting the bolster. In some instances this object has been attained by widening the spring group transversely of the side-frame, and in other instances the additional springs have been introduced by lengthening the spring group longitudinally of the side-frame. The widening of the spring group transversely of the side-frame involves several objectional features. To accommodate such a widened group, the part of the side-frame constituting the seat for the springs has to be widened to an extent that produces an objectionable overhang. The widening of the group has the further effect of increasing the length of that part of the end of the bolster which must be limited in depth to make room for the springs. Ordinarily the depth of the bolster is increased immediately inside of the springs in order to provide the necessary strength, and it is desirable to carry the deep part of the bolster as far toward the ends as possible. Widening the spring group also has the effect of disposing some of the springs at an increased distance from the longitudinal center of the side-frame, which has the effect of throwing the resultant spring load farther from the longitudinal center of the side-frame whenever, due to differences in level between the track rails, the bolster tends to assume an inclined position. Attempts to increase the number of springs by increasing the length of the spring assemblage longitudinally of the side-frame involved either increasing the distance between the columns, or the placing of some of the springs outside of the columns. In those instances where side-frames have been designed to accommodate an increased number of springs between the columns, it has been found necessary to greatly increase the amount of metal in the side-frame in order to provide sufficient strength for the increased length of the part of the side-frame upon which the springs rest between the columns, which part in previous structures functions largely as a beam. Furthermore, such lengthened spring assemblages heretofore proposed have interfered with the brake beam, and have therefore necessitated lengthening the side-frame and wheel base in order to obviate interference between the spring plank and side-frame with the brake beam. In structures heretofore proposed wherein the increased number of springs has been provided for by placing additional springs outside of the columns, it has, of course, been necessary to provide the bolster with some form of separable end member extending around the columns for the purpose of co-acting with the end springs. This introduces an additional element of cost, and is objectionable in practice in that it adds complexity to the structure. Furthermore, when the additional springs are placed outside of the columns, the length of the spring group longitudinally of the side-frame may be increased to such an extent as to render the use of some equalizing means necessary in order to avoid torsion upon the bolster when all four wheels are not in the same plane.

In order to obviate the objections above pointed out I have devised a spring assemblage wherein I increase the length of the spring assemblage longitudinally of the side-frame without either substantially increasing the transverse width of the side-frame and its spring seat, or introducing any other element to interfere with the brake beams. With my improved spring assemblage I find it possible, without interference with the brake beam, to use six springs with a shorter wheel base than that now used for the accommodation of five springs. I effect this result by using a central group of springs which may occupy the same space heretofore utilized for the commonly used four and five spring groups, and place the added springs one at each end of the central group, and upon or adjacent to the longitudinal center line of the side-frame. By this means I accommodate the added springs without departing substantially from the limits of transverse width now observed in the construction of side-frames.

In side-frames as heretofore constructed, the central part of the lower or tension member upon which the springs are seated has been calculated as a beam, in addition to its function as a member of the side-frame truss. It is for this reason that spreading the columns of such side-frames for the accommodation of an additional number of springs has necessitated a great increase in the amount of metal used, such additional metal being necessary to provide strength for this part when calculated as a beam. By utilizing the suspension line as the bases for the form of the tension member with the result of throwing the stresses due to vertical load in tension, I have been enabled to increase the separation of the columns without involving the necessity of using extra metal to provide the necessary strength.

The approximation to a suspension line in the tension member dispenses with the necessity of forming the central part of the tension member beneath my intermediate group of springs of as great vertical depth as necessary when this part of the tension member functions largely as a beam, as in the case of prior structures. This has the advantage of increasing the vertical space above the central part of the tension member for the accommodation of the springs and bolster, the possibility of increasing the vertical depth of the bolster ends being of advantage in economizing metal. The lengthening of the spring assemblage longitudinally of the side-frame above referred to as a feature of my invention, has the additional advantage of disposing the spring support farther from the longitudinal axis of the bolster, thereby better resisting the tendency of the bolster to tilt on its longitudinal axis as a center, which tilting has the effect of causing irregular and increased wear upon the co-acting wear surfaces of the bolster and columns.

Referring now to the structure shown in Figures 34 to 47, I have here illustrated my invention in connection with a side-frame having separable journal boxes, the junction of the tension member 1 with the compression member 2 being at the tops of the journal boxes. In this side frame the compression member, tension member, and columns form an integral structure. The spring seat is formed upon and forms a structural part of the central part of the tension member. The spring seat forms the upper web of the box section in which the central part of the tension member is formed. The central part 6 of the spring seat is at a lower level than the end sections 7, the latter being connected to the former by an upwardly extending section 8 which is integral with the remainder of the structure. The outer ends of the elevated sections 7 of the spring seat are provided with upward extensions 13 which are continued upwardly to the compression member 2, thus forming the webs of the columns 14. The spring plank 15 is provided with upwardly extending side flanges 16 and is substantially of the same width as the central part 6 of the spring seat. In this embodiment of my invention I have shown an assemblage of six springs, four springs 17 arranged in rectangular form offset in pairs upon opposite sides of the longitudinal center line of the tension member constituting an intermediate group which rests upon the spring plank and is supported by the central section 6 of the spring seat. The end springs 18 are supported by the elevated end sections 7 of the spring seat independently of the spring plank 15. The end sections 7 of the spring seat project inwardly, as indicated at 19, beyond the upwardly extending parts 8 of the spring seat and beyond the side flanges 16 of the spring plank. These inward projections 19 of the end sections of the spring seat are of segmental form, as indicated at 19, in Figure 35. In this arrangement the end springs 18 project into the spaces between the adjacent intermediate springs 17. Underlying the entire spring assemblage is a spring plate 20, shown in detail in Figures 45, 46, and 47. This spring plate is constructed with a depressed center and elevated ends 21 connected by upwardly extending parts 22 and is provided with downwardly extending tongues 23 designed to overlie the sides of the spring seat to hold the plate in position. The spring plate 20 is also provided with upwardly extending bosses 24 designed to hold the springs in position.

As above indicated, the elevation of the spring seat at 7 and the continuation of the same upwardly in the form of the web 13 raises the center of mass of the tension member at the point 25 to an extent which brings the center of mass substantially into coincidence with the theoretical suspension line resulting from the load for which the frame is designed, and accomplishes this purpose without the introduction of any substantial amount of metal other than that necessary independently of the formation of a spring seat. In my improved construction the upward inclination of the end portion of the tension member begins at the point indicated by the numeral 26 below the spring assemblage and substantially below the inner edge of the end spring 18. In the ordinary construction above referred to wherein the central part of the tension member between the columns is formed in a straight line with the springs seated on one level, the upward inclination of the end portion of the tension member begins at the junction of the tension member with the columns, at about the point indicated by the small circle numbered 27. From this fact it is apparent that the elevation of the end sections 7 of the spring seat eliminates the objectionable angle at 27 and distributes the metal more nearly on the suspension line. While the lengthening of the spring assemblage longitudinally of the side frame, which is caused by the use of single end springs 18 as compared with such an arrangement as shown in Figure 16, has a tendency to flatten the suspension line and lower that line at the bases of the columns, the resulting theoretical suspension line curves upwardly from points inside of the columns as above explained.

In this embodiment of my invention I have shown also a bolster of such form as to receive springs of the same length upon the central and end sections of the spring seat. The form of this bolster is shown in detail in Figures 42, 43, and 44. The central section 28 of the ends of the bolster is of greater vertical depth than the projections 29, the central section 28 resting upon the intermediate springs 17 and the side projections 29 resting upon the ends springs 18. The bolster is restrained against endwise movement relative to the side frame by means of guide flanges 30 which extend inwardly from the webs 13 of the columns. These guide flanges 30 are provided at their inner edges with extensions 31 which project transversely of the side frame to increase the horizontal extent of the coacting wearing surfaces upon the bolster and columns. The downward extent of the guide flanges 30 is limited by the necessity of sufficiently lowering the bolster to permit of its endwise insertion in and removal from the side frame. The deep central section 28 of the bolster end is provided with side projections 32 to extend the spring bearing over the intermediate springs. The overall width measured from the extremities of opposite projections is less than the distance between the inner faces of the upwardly extending parts 8 of the spring seat and the overall width of the bolster end between the points 33 between the projections 32 is less than the distance between the inner edges of the extensions 19 of the elevated ends of the spring seat. This relation of the width of the parts mentioned permits the deep central section 28 of the bolster to be lowered between the elevated ends of the spring seat, this lowering being sufficient to bring the upper surface of the bolster just beneath the lower ends 34 of the guide flanges 30 and when in this position the bolster can be inserted in and removed from the side-frame by an endwise movement.

The position of the brake-heads 35 relative to the side-frame, spring assemblage and spring plank is clearly shown in Figures 34 and 35. The brake construction may be of the usual form embodying brake hanger brackets 36, which form a part of the side frame. The form of the bolster permits the location of the brackets 36 close enough to the center of the side-frame to allow the brake-shoes to fall away from the wheel when the brakes are released, thereby permitting the brake-heads to travel in the unobstructd path provided for them. This unobstructed path, as will be apparent from Figure 35, is provided by limiting the width of the spring plank opposite the brake-heads, and the use of single end springs. The part of the spring plank outwardly beyond the brake-heads may be of only the width of the central portion of the spring seat, as shown in Figures 34 to 38, but so far as the movement of the brake-heads is concerned, no necessity exists for narrowing the spring plank where it extends outwardly beyond their paths of movement.

Owing to the elevation of the end springs 18 their upper ends will in the preferred construction extend above the lower edges 34 of the column guides 30, and the elevation of the end sections 7 of the spring seat limit the downward extent of the column guides 30 for the reason that the widened part of the bolster opening between the end sections 7 of the spring seat and the column guides 30 must be of sufficient vertical extent to permit assemblage of the bolster and side-frame. I compensate for the vertical limitation of the extent of the co-acting bearing surfaces upon the columns and bolster by increasing their horizontal dimensions. I place the guide lugs which are necessary to prevent endwise movement of the bolster relative to the side-frame upon the columns at the outer edges of the main bearing surface, and by so doing I reduce the over-all width of the bolster ends, thus dispensing with the necessity of any widening of the bolster opening for assemblage other than the widening obtained by omitting the guide lugs on the lower parts of the columns. This leaves the lower parts of the columns unrestricted by any limitations other than meeting the service stresses. The central part of the bearing surface on the columns may lie close to the end springs, a working clearance being sufficient separation, and the guide lugs on the columns may extend abreast of the upper part of the end springs, this arrangement serving to avoid any unnecessary lengthening of the side-frame at this point or widening of the bolster.

The end 29 of the bolster is formed as clearly shown in Figs. 40 and 43, with a central projecting section 37 which is received between the column guide flanges 30, and with bearing surfaces 38 co-acting with the flanges 31 of the column guides. The horizontal dimensions of the bearing surfaces 38 and flanges 31 may be varied to provide the requisite area of wearing surface between the bolster and columns. The form of the end of the bolster lends itself to the addition of stiffening ribs with a minimum expenditure of metal for that purpose. As shown in Figures 42, 43, and 44, it is merely necessary to continue the side walls 46 of the deep central section upwardly in the form of internal strengthening ribs 47 which extend to the top of the bolster.

In the structures described in my co-pending application above referred to I raised the cross-sectional center of mass of the tension member adjacent the bases of the columns partly by elevating the end sections of the spring seat and partly by recessing the lower ends of the end springs within the tension member, the part of the side walls of the tension member extending above the end sections of the spring seat serving to contribute to the raising of the cross-sectional center of mass. In the structure illustrated in Figure 34 of this application reliance for raising the center of mass of the tension member is placed principally upon the raising of the end sections of the spring seat, the elevation being of such extent as to raise the end sections of the spring seat above all but a small part of the transversely adjacent part of the tension member.

In Figures 1 to 7, and 28 to 33, I show my invention in a structure generally similar to that shown in Figures 34 to 47. In the form shown in Figures 1 to 7, however, the end sections 48 of the spring seat are not elevated to as great an extent above the central section 49 as in Figures 34 to 47, and the side walls 50 of the tension member project to a greater extent above the end sections of the spring seat, and thereby contribute to a greater extent relative to the elevated end section in the raising of the center of mass of the tension member into coincidence with the theoretical suspension line. As shown in Figure 2, the end springs 51 in this form are not set into the spaces between the intermediate springs 52 as in Figure 35, but are similar to the arrangement shown in Figure 22. The column guides 53 in this form have wear faces only on the inner sides of the columns and inner faces of the guide flanges to co-act with the projections 54 on the bolster ends. The guide flanges have inner edges inclining outwardly toward the bottom where they converge with the side walls of the columns at 55. The bolster as shown in Figures 28 to 31 is similar to the bolster above described in its general outline including the lesser vertical depth of the projections 54. The side walls 56 of the bolster, as shown most clearly in Figure 29, are deflected inwardly as indicated at 57 in order to clear the end springs 51, the inner extremity of the end springs being about on a line with the outer extremities of the intermediate springs 52. For the purpose of permitting endwise insertion of the bolster in the bolster opening the guide flanges 53 upon the inner sides of the side frame are cut away at 58, the horizontal lower end of the inner guide flanges being indicated by the horizontal line to which that numeral is applied upon Figure 1. The central deep section 59 of the bolster in this form is of slightly greater width than the distance between the upright parts 60 of the web which joins the central and elevated end sections of the spring seat. This prevents the lowering of the bolster farther than the tops of the elevated end sections of the spring seat, but assemblage is permitted, as above described, by terminating the inner guide flanges 53 upon the line 58, as above stated. In the form shown in Figure 1, instead of having the elevated end section 48 of the spring seat project inwardly beyond the upright seat portion 60 of the web joining the central and end sections of the spring seat, I have deflected the wall 60 inwardly, as indicated at 62, upon an arc of substantially the radius of the end springs, thus providing for the seating of the inner parts of the end springs. With this construction I form the spring plank with indentations indicated at 61 in Figure 6, and assemble the structure by inserting the spring plank endwise into the wide part of the bolster opening and then lowering it vertically with the indentations 61 in registry with the inwardly projecting parts 62 of the web 60. The construction described permits bringing the end springs closer to the intermediate springs than would be possible were the sides of the spring plank and the webs 60 straight.

In Figs. 29 and 30 the brake-heads are diagrammatically represented at 63. In Figure 29 I have shown my improved spring arrangement thereby clearly exhibiting the free path provided by my construction for the movement of the brake-head. Figure 29 is a view of the bolster, but the spring plank lies directly beneath the bolster, and being narrower than the bolster, as apparent from the other views, Figure 29 serves to illustrate the ample clearance for the brake movement. Figure 30, as above explained in the brief description of the views of the drawing, is continuous with Figure 29, the two together forming a complete view of the contour of the bolster, Figure 30 being a view from the top, and Figure 29 from the bottom. In Figure 30, this being the right-end end of the complete bolster formed by Figures 29 and 30, I have indicated in dotted lines the positions that would be occupied by an assemblage of six springs placed in pairs transversely of the side frame. Such an arrangement of springs would produce interference with the brake-head 63, as illustrated, when the ordinary type of spring plank extending beneath all of the springs is used, as indicated in dotted lines at 64.

In Figures 32 and 33 I have shown a slight modification of the bolster end. In this form the bolster end is narrowed at 65 just outside of the two inside intermediate springs and continues with this lesser width to the end of the bolster. In order to provide a complete seat for the outer two intermediate springs I have provided projecting shelves 66. These projecting shelves 66 serve the same purpose as the projections 32 shown in Figure 43, there being four such projections in the construction shown in Figure 43, by reason of the narrowing of the deeper part of the bolster inside of the inner pair of intermediate springs, whereas in the form shown in Figures 32 and 33, the deeper section of the bolster is not narrowed until after it has passed the inner pair of intermediate springs.

In Figures 8 to 12, inclusive, I have shown a built-up side-frame having a tension member following a suspension line curve, as hereinbefore described, and with the structural parts of the bolster so disposed as to accommodate my improved spring assemblage. The compression member 87 and tension member 88 of this side-frame are formed of channels. The lower channel is slotted at the angle between the web and flanges from the ends inwardly to about the point indicated by the numeral 89. The web 90 of the channel is bent around the filler casting 91, and also around the web 92 of the compression member. The filler 91 is formed with a rounded end 93 and is provided with a recess in its upper surface to receive the web 92 of the compression member. The side walls 94 of the channel forming the compression member extend outwardly beyond the filler 91 and lie against the projecting ends of the flanges 95 of the tension member, as indicated in Figure 12. Between the flanges 94 and 95 upon the inner side of the frame, and corresponding flanges 94 and 95 on the outer side of the frame, lies a filler 96 which has upwardly extending walls 97, all of these parts being secured together by rivets 98, as shown in Figure 12. The columns are formed from a single integral piece of either pressed, rolled, or cast metal, taking the form of a U with the upwardly directed arms 99 forming the columns, and the cross-member 100' at the bottom forming the spring seat. At the upper part the side arms are of the section indicated in Figure 9. Inwardly directed flanges 101' form guides between which side extensions on the end of the bolster are designed to be received. The spring seat is formed by the web of the channel section, of which the U-shaped member is formed, this web being outwardly extended beyond the side flanges of the channel, as indicated at 102', forming the overhanging side extensions of the spring seat. In this form I have shown the seats 103' for the end springs elevated above the central part 104' upon which the central group of four springs is designed to be seated. The assemblage of the U-shaped member of which the columns and spring seat are formed with the tension member, is indicated in Figure 10.

In Figure 13 I show a side-frame of integral construction, and having the journal boxes also integral with the side-frame structure. In the form shown in this view the bolster 61' is designed to rest directly upon a thin spring plate 62' between the upper ends of the springs and lower surface of the bolster. The spring assemblage to be embodied in this form is the same as that embodied in the form shown in Figure 2. The bolster as shown in Figure 13 has a T-end similar in its general outline to that illustrated in Figures 29 and 30, the side extensions 66' of the T-head resting upon the end springs. The width of the central part of the bolster is indicated at 65', and the ends of the T-head 66' are guided in vertical recesses in the columns, as indicated at 67. The spring plank 68 forming part of this construction is also similar in its general outline to that shown in Figure 2 with side flanges 69. The relation of the springs and spring plank may be as shown in Figure 2. The spring seat 70 is shown as depressed at its central portion 71 by an amount equal to the thickness of the spring plank, to bring all of the springs to the same level. It will be apparent from consideration of Figure 13 and other similar views, that the lengthening of the spring assemblage has a very substantial effect in flattening the suspension line upon which the lower tension member is constructed, and it will also be apparent that a further flattening of this suspension line is obtained by the use of the integral journal boxes shown in Figure 13. The integral journal boxes form supports for the ends of the suspension line tension member at a lower level than is necessary when separable journal boxes are used and the tension member is brought to a junction with the compression member above the journal box, as shown in Figure 2.

In Figures 14 to 27, inclusive, and 48 and 49, I have shown a variety of spring assemblages. The assemblages shown in Figures 14, 15, 16, 48 and 49 represent different spring arrangements heretofore used with all of the springs on the same level, but not with end springs elevated, as indicated in Figure 49. In Figures 17 to 27 I illustrate different forms of my improved spring assemblage, all adapted to have the single end springs elevated and to have all or some of the intermediate springs offset from the line joining the centers of the end springs. While the arrangement shown in Figure 48 has heretofore been used with the springs upon the same level, I am not aware that such an arrangement has heretofore been used with the end springs elevated as indicated in Figure 49. The arrangements of springs shown in Figures 17 to 27, and 48 and 49, are intended to be placed between the columns of the side frame, with the long base of the spring assemblage placed longitudinally of the side frame. It will be observed that in each of the spring assemblages shown in Figures 17 to 27, 48 and 49, there is a single spring at each end of the assemblage, and an intermediate group of springs consisting of two or more individual springs which are offset from a straight line joining the centers of the end springs. The line 1—2 in Figure 17 represents the longitudinal center line of the side-frame, as does the similar line appearing in the other figures. In the arrangement shown in Figure 17, the end springs 72, 73 are directly over the longitudinal center line of the side-frame, and the intermediate springs 74 and 75 are offset therefrom. By offsetting the springs 74 and 75 from the center line, the length of the group longitudinally of the side-frame is diminished. The end springs 72 and 73 are spaced from the central group 74—75 to afford space for the side walls of a spring plank, as explained more in detail above. In the arrangement shown in Figure 18, I have provided for five springs, the two end springs being intended to be located on the center line of the side-frame. In order to keep the resultant center of pressure over the center of the side-frame, I have shown the distance of the spring 76 from the center line twice as great as that of the springs 77 and 78. In this view I have shown the end springs 79 and 80 close to the center group formed by the springs 76, 77 and 78, omitting clearance for the side walls of a spring plank between the end springs and central group. The arrangement shown in Figure 19 is similar to that shown in Figure 18 except for the provision between the end springs and the central group of a space for the side walls of a spring plank. The arrangement shown in Figure 20 is similar to that shown in Figure 19, except for the fact that the end springs 81, 82 are offset outwardly from the longitudinal center line of the side-frame, and the position of the intermediate group of three springs is so related to the center line as to bring the resultant center of pressure of the entire assemblage over the center line. In Figures 17 to 20, inclusive, I have shown springs with outer and inner coils, but it will be obvious that the use of the inner coils depends upon the necessary spring capacity. The assemblage shown in Figure 21 consists of a rectangular group of four single springs with end springs having outer and inner coils, the end springs being set close to the central group. In the arrangement shown in Figure 21, the springs 100, 101, 102, and 103 composing the central group are spread transversely of the side-frame to permit the end springs 104 and 105 to be set in closer for the purpose of shortening the length of the entire assemblage. The arrangement shown in Figure 22 is similar to that shown in Figure 21, except that the springs constituting the central group are brought together at 106 and 107, and the end springs 108 and 109 are spaced away from the central group to provide space for the side walls of the spring plank. The arrangement shown in Figure 23 is similar to that shown in Figure 21, except that the end springs are spaced sufficiently from the central group to admit the side walls of a spring plank. In the arrangement shown in Figure 24, the end springs 110 and 111 are offset outwardly from the longitudinal center line of the side-frame, as in the form shown in Figure 20. In the arrangement shown in Figure 24, however, the central group is composed of four springs, their transverse distances from the longitudinal center line of the side-frame being such as to bring the resultant center of pressure of the entire assemblage over the center line. In the arrangement shown in Figure 25, I have provided a central group of five springs with two end springs 112 and 113. In this arrangement, all of the springs are arranged symmetrically about the longitudinal center line of the side-frame, and they are all arranged in close proximity longitudinally of the side-frame. The arrangement shown in Figure 26 differs from that shown in Figure 25 in that the four corner springs of the central group are spaced away from the longitudinal center line of the side-frame, this permitting all of the springs of the assemblage to be set closer together longitudinally of the side-frame. The arrangement shown in Figure 27 is like that shown in Figure 25 except that the end springs are spaced from the central group sufficiently to afford room for the side walls of the spring plank.

While in Figures 17 to 27 I have illustrated a variety of arrangements of springs embodying my invention, I have not attempted, of course, to exhibit every possible arrangement. The underlying idea of my improved spring grouping is the use of single end springs which do not necessitate objectionable widening of the side-frame at the position occupied by them, and a central group between the end springs which may be of less width transversely of the side-frame than arrangements previously in use, such as shown in Figures 14 and 15, or may be of the same width, or in some instances of slightly greater width, but in no instance of such width as to interfere with the preferred form of the bolster or side-frame.

I claim as my invention:

1. In a structure of the class described, a side-frame comprising an upper compression member, a lower tension member and columns, a spring assemblage supported on said tension member between said columns, said assemblage comprising two end springs, a central group of springs some of which are offset from the straight line between the centers of said end springs, the part of said tension member on which said end springs rest being at a higher level than the intermediate part on which said central group rests.

2. In a railway truck, a side-frame comprising in an integral structure a compression member, a tension member, columns and a spring seat, said spring seat being formed on the upper surface of said tension member between said columns, said spring seat having end sections elevated above the central section thereof whereby the cross-sectional center of mass of said tension member is disposed in a line curving upwardly beneath said end section and approximating the suspension line resulting from the load for which the side-frame is designed, and springs seated on the central and elevated end sections of said spring seat.

3. In a railway truck, side-frames, each of said side-frames comprising an upper compression and lower tension member and columns, a spring seat upon each of said tension members between said columns, said spring seat having end sections elevated above the central section thereof, said central section being of greater width transversely of said side-frame than said end sections, an assemblage of springs between said columns comprising a group of intermediate springs, said intermediate springs being seated upon said central section, a single end spring at each end of said group of intermediate springs, said end springs resting upon said elevated end sections of said spring seat, some of said intermediate springs being offset from the straight line joining the centers of said end springs, and a bolster resting upon said assemblage of springs.

4. In a railway truck, side-frames, each of said side-frames comprising an upper compression and lower tension member and columns, a spring seat upon each of said tension members between said columns, said spring seat having end sections elevated above the central section thereof, said central section being of greater width transversely of said side-frame than said end sections, an assemblage of springs between said columns comprising a group of intermediate springs, said intermediate springs being seated upon said central section, a single end spring at each end of said group of intermediate springs, some of said intermediate springs being offset from the line joining the centers of said end springs, said end springs extending into the spaces between said offset intermediate springs and resting upon said elevated end sections of said spring seat, and a bolster resting upon said assemblage of springs.

5. In a structure of the class described, a side-frame comprising upper and lower members and columns, a spring plank supported on said lower member between said columns, an assemblage of springs between said columns, the intermediate springs of said assemblage resting on said spring plank, and the outer springs resting on said lower member outside of said spring plank.

6. In a railway truck, side-frames, each of said side-frames comprising an upper compression and a lower tension member and columns, a spring seat upon each of said tension members between said columns, a spring plank resting on the central part of said spring seats, an assemblage of springs between said columns and comprising a group of intermediate springs resting on said spring plank, and a single end spring at each end of said intermediate group, said end springs being supported on said spring seats independently of said spring plank and extending beyond the edges of the same.

7. In a structure of the class described, a side-frame, a spring plank supported on said side-frame, a spring assemblage comprising two end springs, a central group of springs some of which are offset from the straight line between the centers of said end springs, said central group resting on said spring plank and said end springs resting on said side-frame outside of said spring plank.

8. In a railway truck, side-frames, each of said side-frames comprising an upper compression and lower tension member and columns, a spring seat upon each of said tension members between said columns, said spring seat having end sections elevated above the central section thereof, a spring-plank resting on and of substantially the width of said central section of said spring seat, an assemblage of springs between said columns and comprising a group of intermediate springs resting on said spring plank and a single end spring at each end of said intermediate group, said end springs being supported on said elevated sections of said spring seat independently of said spring plank.

9. In a structure of the class described, a side-frame, a spring plank supported on said side-frame, a spring assemblage comprising two end springs, a central group of springs some of which are offset from the straight line between the centers of said end springs, said central group resting on said spring plank and said end springs resting on said side-frame outside of said spring plank and at a higher level than said central group.

10. In a railway truck, side-frames, each of said side-frames comprising an upper compression member, a lower tension member and columns, an assemblage of springs between said columns, a spring plank resting on said tension members, the springs in the central part of said assemblage resting on said spring plank and the outer springs of said assemblage being supported independently of said spring plank and extending beyond the edges thereof, a brake beam mounted on said truck, brake heads on said beam and movable therewith parallel to said side frames abreast of said outer springs.

11. In a railway truck, side-frames, each of said side-frames comprising an upper compression and a lower tension member and columns, an assemblage of springs between said columns comprising a group of intermediate springs, a single end spring at each end of said group of intermediate springs, a spring plank resting on said tension members, said intermediate springs resting on said spring plank and said end springs being supported independently of and extending outwardly beyond the edges of said spring plank, a brake beam mounted on said truck, brake heads on said beam and movable therewith parallel to said side-frames abreast of said end springs.

12. In a railway truck, side-frames, each of said side-frames comprising upper compression and lower tension members and columns, a spring seat upon each of said tension members between said columns, said spring seat having end sections elevated above the central section, a spring plank resting on and of substantially the width of said central section of said spring seat, an assemblage of springs between said columns and comprising a group of intermediate and springs resting on said spring plank and a single end spring at each end of said intermediate group, said end springs being supported on said elevated sections of said spring seat independently of said spring plank, and brake heads movably mounted on said truck, the paths of movement of said brake heads extending abreast of and overlapping said end springs.

13. In a railway truck, side-frames, each of said side-frames comprising an upper compression and a lower tension member and columns, a spring seat upon each of said tension members between said columns, said spring seat having end sections elevated above the central section thereof, an assemblage of springs between said columns comprising a group of intermediate springs, a single end spring at each end of said group of intermediate springs, some of said intermediate springs being offset from the straight line joining the centers of said end springs, a spring plank of substantially the width of said central section of said spring seat and resting thereon, said intermediate group of springs resting on said spring plank and said end springs being supported on said elevated sections of said spring seat independently of said spring plank, a brake beam mounted on said truck, brake heads on said beam and movable therewith parallel to said side frames abreast of said end springs.

14. In a railway truck, side-frames, each of said side-frames comprising an upper compression and lower tension member and columns, a spring seat upon each of said tension members between said columns, said spring seat having end sections elevated above the central section thereof, a spring plank resting on and of substantially the width of said central section of said spring seat, an assemblage of springs between said columns and comprising a group of intermediate springs resting on said spring plank and a single end spring at each end of said intermediate group, said end springs being supported on said elevated sections of said spring seat independently of and vertically above the adjacent part of said spring plank.

15. In a truck, a side-frame comprising columns and a spring seat therebetween, said spring seat having end sections elevated above the central section thereof, a spring plank resting on said spring seat, said spring plank having side flanges, an assemblage of springs between said columns comprising a group of intermediate springs and end springs resting on said elevated sections vertically above the adjacent parts of said side flanges.

16. In a railway truck, side frames, spring seats on said side frames, said spring seats having end sections elevated above the central sections thereof, a bolster having end bearings, said end bearings having a relatively deep central section overlying the central sections of said spring seat, and side sections of less depth, said side sections having under surfaces at a higher level than the under surface of said deep central section and overlying said elevated end sections of said spring seat, and springs between said spring seat and bolster.

17. In a railway truck, side frames, spring seats on said side frames, said spring seats having end sections elevated above the central sections thereof, a bolster having end bearings, said end bearings having a relatively deep central section overlying the central sections of said spring seat, and side sections of less depth, said side sections having under surfaces at a higher level than the under surface of said deep central section and overlying said elevated end sections of said spring seat, and springs between said spring seat and bolster, said relatively deep central section of said bolster being of less width than the space between said elevated end sections of said spring seat thereby permitting said central section of the bolster to pass between said elevated end sections of said spring seat.

18. In a railway truck, side-frames, a spring seat upon each of said side-frames, the end portions of said spring seats being at a higher level than the central portions thereof, springs supported on said spring seats, a bolster having end bearings resting on said springs, said end bearings having side side sections at a higher level than the central section thereof, said side and central bolster sections lying respectively over said end and central spring seat sections.

19. In a car truck, a side-frame, column guides in said side-frame, a bolster, a group of springs supported on said side-frame between said column guides, the end springs of said group being positioned substantially on the longitudinal center line of said frame and some of the intermediate springs being offset from said center line, said bolster being widened at the ends to co-act with said end springs.

20. In a structure of the class described, a bolster, a side-frame comprising an upper compression member, a lower tension member and columns, a spring assemblage supported on said tension member between said columns, said assemblage comprising two end springs, a central group of springs, some of which are offset from the straight line between the centers of said end springs, the central opening formed by said compression and tension members and columns being of less width at its upper and lower parts than the end of the bolster, and of greater width at its intermediate part.

21. In a structure of the class described, a bolster, a side-frame, said side-frame having a central opening into which the end of said bolster extends, said opening being narrower at its lower part and wider immediately above said lower part than the bolster-end, the edges of said bolster-end being of less vertical depth, and the central part of said bolster-end being of greater vertical depth than said wider part of said opening.

22. In a structure of the class described, a bolster, a side-frame having wearing faces to co-act with said bolster, the distance between said wearing faces being greater than the width of the central part of said bolster, the ends of said bolster having projections co-acting with said wearing faces, an assemblage of springs resting on said side-frame and supporting said bolster, said spring assemblage comprising a central group and single end springs, one of said end springs being beneath each of said projections on said bolster.

23. In a structure of the class described, a bolster, a side-frame comprising an upper compression member, a lower tension member and columns, said bolster having a relatively narrow central portion and widened ends formed by horizontally extending projections, the opening formed between said columns being at its upper and lower parts of less width than the ends of said bolster and of greater width at a point intermediate the top and bottom of said opening, and a spring assemblage resting on said side-frame between said columns and supporting said bolster, said spring assemblage comprising single end springs underlying said projections on said bolster.

24. In a structure of the class described, a bolster, a side-frame comprising an upper compression member, a lower tension member and columns, a spring assemblage, supported on said tension member between said columns, said assemblage comprising two end springs, a central group of springs some of which are offset from the straight line between the centers of said end springs, said bolster comprising a relatively narrow central part and widened ends formed by horizontally extending projections.

25. In a structure of the class described, a bolster, a side-frame comprising an upper compression member, a lower tension member and columns, a spring assemblage supported on said tension member between said columns, said assemblage comprising two end springs, a central group of springs some of which are offset from the straight line between the centers of said end springs, said bolster comprising a relatively narrow central part and widened ends formed by horizontally extending projections, said end springs being beneath said horizontally extending projections.

26. In a structure of the class described, a side-frame comprising an upper compression member, a lower tension member and columns, a spring assemblage supported on said tension member between said columns, said assemblage comprising two end springs, a central group of springs, some of which are offset from the straight line between the centers of said end springs, the centers of said end springs lying outside of said central group, each of said columns having inwardly projecting parts forming therebetween a vertical guideway, a bolster having end sections of greater width than the central part thereof, said end sections projecting into said guideways, the distance between said columns below said guideways being sufficient to permit endwise insertion and withdrawal of said bolster.

27. In a structure of the class described, a side-frame having a central bolster-receiving opening with recessed vertical guideways in its side walls, a bolster having a relatively narrow central part and widened end sections projecting into and engaging said guideways, an assemblage of springs resting on said side-frame and supporting said bolster, the springs adjacent the edges of said bolster being at a higher level than the intermediate springs.

28. In a railway truck, side-frames, each of said side-frames comprising in an integral structure an upper compression and a lower tension member, a spring seat and columns, an assemblage of springs between said columns, said assemblage of springs having a single spring at each end thereof, guide flanges projecting inwardly from said columns, abreast of and overlapping the upper parts of said end springs when said springs are expanded, and a bolster resting on said assemblage of springs.

29. In a railway truck, side-frames, each of said side-frames comprising an upper compression and a lower tension member and columns, an assemblage of springs between said columns, said assemblage of springs having a single spring at each end thereof, brake-heads movably mounted on said truck, the paths of movement of said brake-heads extending abreast of and overlapping said end springs, and a bolster resting on said assemblage of springs.

30. In a railway truck, side-frames, each of said side-frames comprising an upper compression and a lower tension member and columns, an assemblage of springs between said columns, said assemblage of springs having a single spring at each end thereof, guide flanges projecting inwardly from said columns abreast of and overlapping the upper parts of said end springs when said springs are expanded, brake-heads movably mounted on said truck, the paths of movement of said brake-heads extending abreast of and overlapping said end springs, and a bolster resting on said assemblage of springs.

31. In a railway truck, side-frames, each of said side-frames comprising an upper compression and a lower tension member and columns, an assemblage of springs between said columns, said assemblage of springs comprising single end springs and a group of intermediate springs, some of said intermediate springs being offset from the straight line joining the centers of said end springs, guide flanges projecting inwardly from said columns abreast of and overlapping the upper parts of said end springs when said springs are expanded, and a bolster resting on said assemblage of springs.

32. In a railway truck, side-frames, each of said side-frames comprising an upper compression and a lower tension member and columns, an assemblage of springs between said columns, said assemblage of springs comprising single end springs and a group of intermediate springs, some of said intermediate springs being offset from the straight line joining the centers of said end springs, brake-heads movably mounted on said truck, the paths of movement of said brake-heads extending abreast of and overlapping said end springs, and a bolster resting on said assemblage of springs.

33. In a railway truck, side-frames, each of said side-frames comprising an upper compression and a lower tension member and columns, an assemblage of springs between said columns, said assemblage of springs comprising single end springs and a group of intermediate springs, some of said intermediate springs being offset from the straight line joining the centers of said end springs, guide flanges projecting inwardly from said columns abreast of and overlapping the upper parts of said end springs when said springs are expanded, brake-heads movably mounted on said truck, the paths of movement of said brake-heads extending abreast of and overlapping said end springs, and a bolster resting on said assemblage of springs.

34. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, said end springs resting on said elevated sections of said spring seat, and guide flanges projecting inwardly from said columns abreast of and overlapping the upper parts of said end springs, and a bolster having end projections extending between said guide flanges.

35. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, said end springs resting on said elevated sections of said spring seat, and brake-heads movably mounted on said truck, the paths of movement of said brake-heads extending abreast of and overlapping said end springs, and a bolster resting upon said springs, said bolster having end projections overlying said end springs.

36. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, said end springs resting on said elevated sections of said spring seat, guide flanges projecting inwardly from said columns abreast of and overlapping the upper parts of said end springs, brake-heads movably mounted on said truck, the paths of movement of said brake-heads extending abreast of and overlapping said end springs, and a bolster resting on said springs.

37. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, some of said intermediate springs being offset from the straight line joining the centers of said end springs, said end springs resting on said elevated sections of said spring seat, and guide flanges projecting inwardly from said columns abreast of and overlapping the upper parts of said end springs.

38. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, some of said intermediate springs being offset from the straight line joining the centers of said end springs, said end springs resting on said elevated sections of said spring seat, and brake-heads movably mounted on said truck, the paths of movement of said brake-heads extending abreast of and overlapping said end springs.

39. In a railway truck, side-frames, each of said side-frames comprising an upper compression member, a lower tension member and columns, a spring seat upon each of said tension members between said columns, said spring seat having end sections elevated above the central section thereof, an assemblage of springs between said columns comprising a group of intermediate springs resting on said central section of said spring seat and a single end spring at each end of said intermediate group, some of said intermediate springs being offset from the straight line joining the centers of said end springs, said end springs resting on said elevated sections of said spring seat, guide flanges projecting inwardly from said columns abreast of and overlapping the upper parts of said end springs, and brakeheads movably mounted on said truck, the paths of movement of said brake-heads extending abreast of and overlapping said end springs.

40. In a railway truck, side-frames, each of said side-frames comprising an upper compression and lower tension member, columns and a spring seat having end sections elevated above the central section thereof, said spring seats having integral extensions at the outer ends of said elevated sections, said extensions forming webs of said columns, and springs seated on said central and end sections of said spring seat.

41. In a railway truck, side-frames, each of said side-frames comprising an upper compression and lower tension member, columns and a spring seat having end sections elevated above the central section thereof and integrally connected thereto, and integral extensions at the outer ends of said elevated sections, said extensions forming webs of said columns, and springs seated on said central and end sections of said spring seat.

42. In a railway truck, a side-frame comprising in an integral structure a compression member, a tension member and columns, the part of said tension member between said columns comprising a web having horizontal central and end sections forming a spring seat, the end sections being elevated above said central section and connected thereto by substantially vertically extending parts of said web, and springs resting on said central and end sections.

43. In a railway truck, a side-frame comprising in an integral structure a compression member, a tension member and columns, the part of said tension member between said columns comprising a web having horizontal central and end sections forming a spring seat, the end sections being elevated above said central section and connected thereto by substantially vertically extending parts of said web, said web also extending upwardly at the outer ends of said elevated end sections and forming the webs of said columns, and springs resting on said central and end sections.

44. In a railway truck, a side-frame comprising in an integral structure a compression member, a tension member and columns, the part of said tension member between said columns being of box section, the upper web of said box section having horizontal central and end sections forming a spring seat, the end sections being elevated above said central section and connected thereto by substantially vertically extending parts of said upper web, and springs resting on said central and end sections.

45. In a railway truck, a side-frame comprising in an integral structure a compression member, a tension member and columns, the part of said tension member between said columns being of box section, the upper web of said box section having horizontal central and end sections forming a spring seat, the end sections being elevated above said central section and connected thereto by substantially vertically extending parts of said upper web, said upper web of said box section also extending upwardly at the outer ends of said elevated end sections and thereby forming the webs of said columns, and springs resting on said central and end sections.

46. A side-frame comprising in an integral structure a compression member, a tension member and columns, the part of said tension member between said columns being of box section, the upper web of said box section having horizontal central and end sections forming a spring seat, said central sections of said upper web having transverse section of said upper web having transverse projections forming extensions of said spring seat transversely beyond said box section, the end sections of said upper web being elevated above said central section and connected thereto by substantially vertically extending parts of said upper web, said end sections not extending horizontally beyond the side walls of said box section.

47. A side-frame comprising in an integral structure a compression member, a tension member and columns, the part of said tension member between said columns comprising an upper web forming a spring seat between said columns, said spring seat having a central section of greater width transversely of said side-frame than the end sections thereof, a spring assemblage comprising intermediate springs seated upon said central section and single end springs seated upon said end sections, said end sections being substantially of the same width as said end springs.

48. In a railway truck, side-frames, each of said side-frames comprising an upper compression and lower tension member and columns, an assemblage of springs between said columns, said assemblage of springs having a single end spring at each end thereof, a bolster, each column having a plurality of vertical wearing surfaces lying in different planes and extending transversely of said side-frame and lengthwise of said bolster, and said bolster being provided with co-acting vertical wearing surfaces lying in a plurality of planes.

49. In a structure of the class described, a side-frame comprising an upper compression member, a lower tension member and columns, a spring assemblage supported on said tension member between said columns, said assemblage comprising two end springs, a central group of springs, some of which are offset from the line between the centers of said end springs, the centers of said end springs lying outside of said central group.

50. A structure conforming to claim 1 and in which the compression member, tension member and columns referred to in said claim form integral parts of the side-frame.

51. A structure conforming to claim 3 and in which the compression member, tension member, columns and spring seat referred to in said claim form integral parts of the side-frame.

52. A structure conforming to claim 4 and in which the compression member, tension member, columns and spring seat referred to in said claim form integral parts of the side-frame.

53. A structure conforming to claim 5 and in which the upper and lower members and columns referred to in said claim form integral parts of the side-frame.

54. A structure conforming to claim 6 and in which the compression member, tension member, columns and spring seat referred to in said claim form integral parts of the side-frame.

55. A structure conforming to claim 7 and in which the side-frame referred to in said claim comprises as integral parts thereof an upper compression member, a lower tension member and columns.

56. A structure conforming to claim 8 and in which the compression member, tension member, columns and spring seat referred to in said claim form integral parts of the side-frame.

57. A structure conforming to claim 9 and in which the side-frame referred to in said claim comprises as integral parts thereof an upper compression member, a lower tension member and columns.

58. A structure conforming to claim 10 and in which the compression member, tension member and columns referred to in said claim form integral parts of the side-frame.

59. A structure conforming to claim 11 and in which the compression member, tension member and columns referred to in said claim form integral parts of the side-frame.

60. A structure conforming to claim 12 and in which the compression member, tension member, columns and spring seat referred to in said claim form integral parts of the side-frame.

61. A structure conforming to claim 13 and in which the compression member, tension member, columns and spring seat referred to in said claim form integral parts of the side-frame.

62. A structure conforming to claim 14 and in which the compression member, tension member, columns and spring seat referred to in said claim form integral parts of the side-frame.

63. A structure conforming to claim 15 and in which the columns and spring seat referred to in said claim are integral with each other.

64. A structure conforming to claim 16 and in which the spring seats referred to in said claim are integral parts of the side-frames.

65. A structure conforming to claim 17 and in which the spring seats referred to in said claim are integral parts of the side-frames.

66. A structure conforming to claim 18 and in which the spring seats referred to in said claim are integral parts of the side-frames.

67. A structure conforming to claim 19 and in which the side-frame referred to in said claim comprises as integral parts thereof an upper compression member, a lower tension member and columns.

68. A structure conforming to claim 20 and in which the compression member, tension member and columns referred to in said claim form integral parts of the side-frame.

69. A structure conforming to claim 21 and in which the side-frame referred to in said claim comprises as integral parts thereof an upper compression member, a lower tension member and columns.

70. A structure conforming to claim 22 and in which the side-frame referred to in said claim comprises as integral parts thereof an upper compression member, a lower tension member and columns.

71. A structure conforming to claim 23 and in which the compression member, tension member and columns referred to in said claim form integral parts of the side-frame.

72. A structure conforming to claim 24 and in which the compression member, tension member and columns referred to in said claim form integral parts of the side-frame.

73. A structure conforming to claim 25 and in which the compression member, tension member and columns referred to in said claim form integral parts of the side-frame.

74. A structure conforming to claim 26 and in which the compression member, tension member and columns referred to in said claim form integral parts of the side-frame.

75. A structure conforming to claim 27 and in which the side-frame referred to in said claim comprises as integral parts thereof an upper compression member, a lower tension member and columns.

76. A structure conforming to claim 29 and in which the compression member, tension member and columns referred to in said claim form integral parts of the side-frame.

77. A structure conforming to claim 30 and in which the compression member, tension member and columns referred to in said claim form integral parts of the side-frame.

78. A structure conforming to claim 31 and in which the compression member, tension member and columns referred to in said claim form integral parts of the side-frame.

79. A structure conforming to claim 32 and in which the compression member, tension member and columns referred to in said claim form integral parts of the side-frame.

80. A structure conforming to claim 33 and in which the compression member, tension member and columns referred to in said claim form integral parts of the side-frame.

81. A structure conforming to claim 34 and in which the compression member, tension member, columns and spring seat referred to in said claim form integral parts of the side-frame.

82. A structure conforming to claim 35 and in which the compression member, tension member, columns and spring seat referred to in said claim form integral parts of the side-frame.

83. A structure conforming to claim 36 and in which the compression member, tension member, columns and spring seat referred to in said claim form integral parts of the side-frame.

84. A structure conforming to claim 37 and in which the compression member, tension member columns and spring seat referred to in said claim form integral parts of the side-frame.

85. A structure conforming to claim 38 and in which the compression member, tension member, columns and spring seat referred to in said claim form integral parts of the side-frame.

86. A structure conforming to claim 39 and in which the compression member, tension member, columns and spring seat referred to in said claim form integral parts of the side-frame.

87. A railway car truck side-frame comprising in an integral structure an upper compression member, a lower tension member and columns, an assemblage of springs resting on said tension member between said columns, said tension member inclining upwardly toward the ends of said side-frame from points between said columns, the central springs of said spring assemblage resting on the central lowermost part of said tension member and the outer springs adjacent the columns being supported at a higher elevation upon the upwardly inclining parts of said tension member, and a bolster resting on said assemblage of springs, said bolster being vertically deeper over said central springs than over said outer springs.

88. A railway car truck side-frame comprising in an integral structure an upper compression member, a lower tension member and columns, said tension member inclining upwardly toward the ends of said side frame from points between said columns and having substantially vertical side walls and an upper web, said web having integral upwardly directed end sections extending into and forming the webs of said columns, an assemblage of springs resting on said tension member between said columns, the central springs of said assemblage being supported on the central lowermost part of said web and the outer springs adjacent the columns being supported on said web at a higher level.

89. In a railway truck, a side-frame comprising in an integral structure a compression member, a tension member and columns, an assemblage of springs supported on said tension member between said columns, said tension member having side walls, outwardly projecting flanges at the upper edges of said side walls, the central parts of said flanges being horizontal and forming transverse extensions of the central part of said tension member upon which the central springs of said spring assemblage are supported and the parts of said flanges beyond said central parts inclining upwardly from points between the inner sides of said columns, supports for the outer springs of said assemblage adjacent said columns and at a higher level than the central horizontal and adjoining inclined parts of said outwardly projecting flanges.

90. In a structure of the class described, a side-frame, a spring plank supported on said side-frame, a spring plate, the central part of said spring plate resting on said spring plank and the end sections of said spring plate extending beyond said spring plank and resting on said side-frame outside of said spring plank.

91. In a structure of the class described, a side-frame, a spring plank supported on said side-frame, a spring plate, the central part of said spring plate resting on said spring plank and the end sections of said spring plate extending beyond said spring plank and resting on said side-frame outside of said spring plank, and tongues extending downwardly from the opposite sides of the ends of said spring plate and engaging the opposite sides of said side-frame.

92. In a railway truck, side-frames, each of said side-frames comprising an upper compression and lower tension member and columns, a spring seat upon each of said tension members between said columns, said spring seat having end sections elevated above the central section thereof, a spring plank resting on and of substantially the width of said central section of said spring seat, a spring plate having end sections elevated above the central section thereof, the central section of said spring plate resting on said spring plank and the end sections of said spring plate resting on said side-frame outside of said spring plank, and springs resting on said central and elevated end sections of said spring plate.

93. In a structure of the class described, a side-frame having a spring seat with end sections at a higher level than the central section thereof, a bolster having a spring seat at each end the central section of which is at a lower level than the end sections thereof, springs between said spring seats, and a spring plate having its central section at a lower level than its end sections and lying between one of said spring seats and said springs.

In witness whereof, I hereunto subscribe my name this 6th day of January, A. D., 1923.

GEORGE S. CHILES